United States Patent [19]

Fukunaga

[11] Patent Number: 5,399,142

[45] Date of Patent: Mar. 21, 1995

[54] ROLL

[75] Inventor: Noritomo Fukunaga, Tokyo, Japan

[73] Assignee: Kinyosha Company, Limited, Tokyo, Japan

[21] Appl. No.: 198,633

[22] Filed: Feb. 18, 1994

[30] Foreign Application Priority Data

Feb. 22, 1993 [JP] Japan .................. 5-054653

[51] Int. Cl.$^6$ .............................................. B23B 9/04
[52] U.S. Cl. .................................... 492/59; 492/56; 428/36.4
[58] Field of Search .............. 492/56, 59; 428/36.4, 428/36.9, 402, 447

[56] References Cited

U.S. PATENT DOCUMENTS

| | | | |
|---|---|---|---|
| 4,125,362 | 11/1978 | Matsui et al. | 492/59 |
| 4,258,089 | 3/1981 | Anderson et al. | 492/59 |
| 4,264,181 | 4/1981 | Lentz et al. | 492/59 |
| 4,272,179 | 6/1981 | Seanor | 492/59 |
| 4,438,063 | 3/1984 | Sugura et al. | 492/59 |
| 4,970,098 | 11/1990 | Ayaler-Esquilen et al. | 492/59 |
| 4,984,027 | 1/1991 | Derimiggio et al. | 492/59 |
| 5,269,740 | 12/1993 | Fitzgerald et al. | 492/59 |
| 5,292,606 | 3/1994 | Fitzgerald | 492/59 |
| 5,336,539 | 8/1994 | Fitzgerald | 428/36.8 |

Primary Examiner—Irene Cuda
Attorney, Agent, or Firm—Sherman and Shalloway

[57] ABSTRACT

A roll wherein a non-adherent coating layer comprises a peroxide crosslinked fluororubber in which a low-molecular weight ethylene tetrafluoride resin or low-molecular weight ethylene tetrafluoride and a powder of a solid element and/or an inorganic compound having surface energy higher than that of copper are compounded.

11 Claims, No Drawings

ROLL

FIELD OF THE INVENTION

The present invention relates to a roll having a rigid core and a non-adherent coating layer, and, in particular, to a roll in which said non-adherent coating layer comprises a peroxide crosslinked fluororubber and which exhibits an excellent performance as a hot-pressing fixing roll of a dry electrostatic duplicator.

PRIOR ARTS

Conventionally, hot-pressing fixing by means of a heated roll having a metal core and a non-adherent coating layer has been employed generally as a fixing system of a dry electrostatic duplicator. As materials for the non-adherent coating layer of the hot-pressing roll are proposed a fluorine resin (U.S. Pat. No. No. 3,268,351), a dimethyl silicone rubber (U.S. Pat. No. No. 3,666,247, Japanese Laid-Open Patent Publication No. 46,819/1977), a phenyl silicone rubber (Japanese Laid-Open Patent Publication No. 209,129/1984), a fluorosilicone rubber (Japanese Laid-Open Patent Publication No. 26,947/1991) and a fluororubber (Japanese Laid-Open Patent Publication No. 135,876/1980). Some of them are employed for practical use.

However, these materials do not have sufficient non-adherence to a toner for dry development. In order to extend the endurance life of a fixing roll, therefore, a so-called oil-feed method has to be employed, by which a silicone oil is always supplied on the surface of a roll.

A roll coated with a fluorine resin generally exhibits excellent non-adherence and not always needs the supply of a silicone oil, but since it has a hard surface and lacks rubber elasticity, it has a defect of giving unnecessary gloss to the copied surface. Regarding a roll coated with a dimethyl silicone rubber, dimethyl silicone absorbs a silicone oil when heated and expands, and gives rise to deterioration at an early stage and becomes incapable of being used. With respect to phenyl silicone rubber coating, though silicone oil resistance is improved, non-adherence to a toner tends to be decreased. Fluorosilicone rubber coating has sufficient silicone oil resistance, but it is poor in non-adherence, heat resistance and physical strength. In particular, its maximum service temperature is about 180° C., and, accordingly, it cannot be used at 230° C., a surface temperature of a hot-pressing fixing roll required for a high-speed duplicator of today. Fluororubber coating can sustain a service temperature of 270° C. and is not invaded with a hot silicone oil at all. However, it is poor in non-adherence to a toner and needs the supply of a large amount of a silicone oil.

Problems for the Invention to Solve

Accordingly, the object of the present invention is to provide a roll having a rigid core and a non-adherent coating layer and exhibiting excellent non-adherence, high rubber elasticity and heat resistance.

Another object of the present invention is to provide a hot-pressing fixing roll of a dry electrostatic duplicator which exhibits excellent endurance and non-adherence with excellent toner resistance and in which the employment of an oil-feed method can be omitted.

Means for Solving the Problems

The present invention (a first invention) is characterized by the point that a non-adherent coating layer comprises a peroxide crosslinked fluororubber in which a low-molecular weight ethylene tetrafluoride resin is compounded and according to it can be dissolved the defects of prior arts widely.

As crosslinking methods of a fluororubber have been developed such methods taking advantage of the characteristics of polymers as amine crosslinking, polyol crosslinking, peroxide crosslinking and the like. Besides, the development of a polymer suitable for each crosslinking method has been conducted.

The peroxide-type fluororubber to be used in the present invention is a flurorubber having halogen, particularly, bromine and/or iodine and a hydrogen atom introduced into the terminal of a polymer molecular chain and the side chain, and crosslinking is conducted according to a drawing reaction of a halogen atom and a hydrogen atom. In Examples of the present invention, crosslinking is carried out in a conventional manner, using a radical generator represented by an organic peroxide compound as a crosslinking agent and a crosslinking auxiliary, generally triallyl isocyanurate. It is one of the main characteristics of the present invention to choose and use a peroxide crosslinked fluororubber as a base material of a non-adherent coating layer. As is apparent according to Comparative Test to be described later, satisfactory non-adherence cannot be obtained by an amine crosslinked fluororubber and a polyol crosslinked fluororubber.

As a peroxide crosslinked fluororubber, those having a high molecular weight with a Mooney viscosity of 90° or more $ML_{1+10}(100° C.)$ are preferable. As is shown in Comparative Test to be described later, those with a low Mooney viscosity cannot form a coating having sufficient non-adherence.

A low-molecular weight ethylene tetrafluoride resin to be used as a non-adherence imparting agent in the present invention is a polymer of ethylene tetrafluoride having a molecular weight of the order of $10^3$–$10^5$. It has been used as an additive for the decrease of the coefficient of dynamic friction, the improvement of abrasion resistance or the improvement of tear strength of rubber, plastics, oil, ink and paints. Commercially available examples include Lubron* L-5, L-2 (Daikin Kogyo), MP 1100, 1200, 1300, 1400, 1500, and TLP-10F-1 (Mitsui-DuPont Fluorochemicals).

The compounding ratio of a low-molecular weight ethylene tetrafluoride resin is not particularly restricted. In order to impart sufficient non-adherence, however, it is preferable to compound 60 weight parts or more of it based on 100 weight parts of a fluororubber. An ethylene tetrafluoride resin to be used for forming has a high molecular weight of the order of 10 . It is difficult to compound such a resin in a fluororubber in a large amount and uniformly and, therefore, it is not suited to be used in the present invention.

A second invention is characterized by the point that an inorganic filler comprising a solid element and/or an inorganic compound powder having surface energy higher than that of copper is compounded in a non-adherence coating layer in addition to a low-molecular weight ethylene tetrafluoride resin.

It is common to compound an inorganic filler such as alumina and copper powder in a non-adherent coating layer of a hot-pressing fixing roll in order to impart abrasion resistance and high thermal conductivity. Particularly, according to the recent speeding-up of copying, the compounding of a high thermal conductive inorganic filler is indispensable except a special case wherein a coating film is extremely thin.

However, the following has been revealed: when alumina and copper powder, which have been ordinarily used, are used as inorganic fillers, high thermal conductivity can be imparted but non-adherence is remarkably impaired and, therefore, the effects of a first invention cannot be exhibited at all.

The present inventor made studies about the properties, functions and effects of various inorganic fillers. As a result, he has found that, contrary to the general anticipation regarding the wetting of a solid material and surface energy, by the use of an inorganic material having extremely high surface energy, particularly a powder of a solid material (a solid element and a solid inorganic compound) having surface energy higher than that of copper, the effects according to a first invention, that is, high thermal conductivity, can be imparted without impairing excellent non-adherence. This finding has led to the completion of a second invention. Specific examples of inorganic fillers preferably used in Examples of a second invention are powders of cobalt, iron-cobalt alloy, tungsten and tungsten-carbide.

The compounding amount of these inorganic fillers is not particularly restricted. From the viewpoints of high thermal conductivity and abrasion resistance, however, it is used in an amount of 20 weight parts or more based on 100 weight parts of a fluororubber. A powder preferably used as an inorganic filler has an average particle diameter of 1–15 μm. Powders with an average particle diameter of less than 1 μm are hard to handle. On the other hand, those with an average particle diameter of more than 15 μm separate from the surface of a crosslinked rubber product (coating layer of a roll) and may impair its smoothness.

Comparative Test

Comparative Test on non-adherence was carried out according to the following procedure:

A sheet of 100 mm×100 mm having a thickness of 2 mm is prepared from each rubber. One side of a sheet is abraded with a sandpaper #400. 120 mg of a toner for a dry electrostatic duplicator (NP-7550, manufactured by Canon) are spread on the surface of a polyester film of 100 mm×100 mm uniformly.

Subsequently, on the side of the polyester film spread with a toner is lapped the abraded side of the rubber sheet. Both sheets are contact-bonded by a pressure of 300 g/cm$^2$ and heated in a constant temperature bath of 190° C. for 30 minutes. Then, the sheets stuck together are taken out from the constant temperature bath and separated from each other 15 minutes after the removal of pressure. The "coverage" of the toner is shown at weight % of the toner remaining on the surface of the fluororubber sheet to the total toner (120 g).

| (1) Comparison in types of crosslinking | |
|---|---|
| (A) Amine crosslinking | |
| Compounding: weight parts | |
| Daiel G-501 | 100 (Daikin Kogyo) |
| Magnesium oxide 1) | 15 |
| V-3 2) | 3 |
| Lubron L-2 3) | 90 |
| Vulcanization: | |
| Press vulcanization | 160° C. × 20 minutes |
| Oven heating | 200° C. × 24 hours |
| 1) Kyowamag 30 (Kyowa kagaku Kogyo) | |
| 2) Vulcanizing agent | |

| -continued | |
|---|---|
| (1) Comparison in types of crosslinking | |
| N,N-dicinnamilydene-1,6-hexane-diamine (Daikin Kogyo) | |
| 3) Low-molecular weight polytetrafluoroethylene (Daikin Kogyo) | |
| (B) Polyol crosslinking | |
| Compounding: weight parts | |
| Daiel G-701 | 100 (Daikin Kogyo) |
| Calcium hydroxide 4) | 6 |
| Magnesium oxide 5) | 3 |
| Lubron L-2 | 90 |
| Vulcanization: | |
| Press vulcanization | 170° C. × 10 minutes |
| Oven heating | 230° C × 24 hours |
| 4) Cultic 2000 (Omi Kagaku Kogyo) | |
| 5) Kyowamag 150 (Kyowa Kagaku Kogyo) | |
| (C) Peroxide crosslinking | |
| Compounding: weight parts | |
| Daiel G-912 | 100 (Daikin Kogyo) |
| Triallyl isocyanurate 6) | 4 |
| Perhexa 2 5B 7) | 1.5 |
| Lubron L-2 | 90 |
| Vulcanization: | |
| Press vulcanization | 160° C. × 10 minutes |
| Oven heating | 180° C. × 4 hours |
| 6) Talc, vulcanizing auxiliary (Nihon Kasei) | |
| 7) Peroxide 2,5-dimethyl-2,5-di-t-butyl peroxy-hexane (Nihon Yushi) | |

| Results of tests: | Toner coverage (wt. %) |
|---|---|
| Amine crosslinking | 27 |
| Polyol crosslinking | 32 |
| Peroxide crosslinking | 23 |

According to the above results, it is apparent that peroxide crosslinking is superior to amine crosslinking and polyol crosslinking in non-adherence.

| (2) Influence of Mooney viscosity in peroxide crosslinking | |
|---|---|
| Compounding: weight parts | |
| Rubbers each having a different Mooney viscosity 8) | 100 |
| Triallyl isocianurate | 4 |
| Perhexa 2 5B | 1.5 |
| Lubron L-2 | 90 |
| Vulcanization: | |
| Press vulcanization | 160° C. × 10 minutes |
| Oven heating | 180° C. × 4 hours |

| 8) Daiel | Mooney viscosity $ML_{1+10}$ (100° C.) |
|---|---|
| G-912 | 76 |
| G-901 | 97 |
| G-901H | 159 |

| Results of tests: | Toner coverage (wt. %) |
|---|---|
| G-912 | 23 |
| G-901 | 16 |
| G-901H | 7 |

As described regarding the constitution of the present invention, it is apparent to those skilled in the art that various modifications are possible so far as they do not deviate from the range and the spirit of the present invention.

For example, a powder particle of an inorganic filler is not restricted to a particle of a single material. It may have a double constitution of a core of a material with low surface energy and a coating layer of a material with high surface energy.

Vulcanizing conditions can also be changed properly. Standard oven heating conditions are 180° C. and 4 hours. Since the surface temperature of a hot-pressing fixing roll during copying is raised to 230° C., they may be 250° C. and 24 hours. Besides, primary vulcanization and secondary oven heating can be conducted in vacuum or in inactive gas such as carbon dioxide gas, helium gas, argon gas or nitrogen gas. In primary vulcanization and/or secondary heating, radiations can also be utilized. If desired, ultraviolet-light irradiation or a fluorine gas treatment can be employed in a crosslinked rubber.

Moreover, the following substances can be compounded in the non-adherent coating layer of the roll of the present invention in such a range as would not substantially impair its excellent non-adherence in order to impart or improve special properties.

Improvement of the physical characteristics of rubbers: carbon black such as MT and FT Imparting of conductivity: Ketchen black (Ketchen EC), acetylene black, carbon fiber, conductive metal coating powder, inorganic and ceramic whisker powder Prevention of static electrification: various antistatic agents, surfactants Improvement of abrasion resistance: mica powder and the like Imparting of processability: thermoplastic fluororubber (Daiel thermoplastics), low-molecular weight liquid flurororubber (Daiel G-101) and fluorosilicone oil and fluorosilicone rubber, fluorine oil Compatibility improving agents, thermoresistance additives and wetting improving agents with silicone oil: silicone oil and reactive silicone oil, silicone resin, silicone coupling agents Others: PFA (tetrafluoroethylene-perfluorovinyl ether copolymer resin), FEP (tetrafluoroethylene-hexafluoropropylene copolymer resin), tetrafluoroethylene oligomers and reactive perfluoroalkylating agents, perfluoroalkyl compounds, fluoroether compounds, fluoroalkylvinyl ether compounds Hereunder, the present invention will be described more in detail according to Examples. They are only for explanation and do not restrict the range of the present invention at all.

EXAMPLE 1

A compound was prepared from 4 kinds of peroxide crosslinked fluororubbers with different Mooney viscosities according to the following compounding recipe.

| Compounding: weight parts | |
|---|---|
| Raw fluororubber | 100 |
| TAIC | 4.0 (Nihon Kasei) |
| Perhexa 25B | 1.5 (Nihon Yushi) |
| Lubron L-2 | 60.0 (Daikin Kogyo) |
| Fe50Co | 75.0 (Kobe Seiko) |
| MT carbon black | 5.0 (R. T. Vanderbilt) |

Subsequently, an aluminum core having a diameter of 59.0 mm was washed with 1,1,1-trichloroethane, and an adhesive (Monicas VT-200, manufactured by Yokohama Kobunshi Kenkyusho) was applied thereto in order to improve adherence. After it was air-dried for 30 minutes, it was baked at 150° C. for 15 minutes. The core thus subjected to an adhesion treatment was wound with the above compound and subjected to press vulcanization at 160° C. for 30 minutes by means of an exclusive tool. Subsequently, after the resultant product was subjected to oven heating at 180° C. for 4 hours, the surface of the roll was finished to have a diameter of 60 mm by abrading the surface.

The obtained roll was fitted as a hot-pressing fixing roll to a dry electrostatic duplicator of A-4 letting-in crosswise 50 sheets/min (NP-7550, manufactured by Canon). The degree of stain by a toner on the surface of the roll was observed by running the machine and the final endurance life (number of copies) was evaluated. The results are shown in Table 1.

TABLE 1

| Raw fluoro-rubber Daiel | Mooney viscosity $ML_{1+10}$ (100° C.) | Final endurance life ($\times 10^3$ sheets) |
|---|---|---|
| G-902 | 50 | 38 |
| G-912 | 76 | 72 |
| G-901 | 97 | 106 |
| G-901H | 159 | 172 |

EXAMPLE 2

The same procedure as in Example 1 was repeated by changing the compounding amount of low-molecular weight ethylene tetrafluoride.

| Compounding: weight parts | |
|---|---|
| Daiel G-901 | 100 |
| TAIC | 4.0 |
| Perhexa 25B | 1.5 |
| Fe50Co | 75.0 |
| MT carbon black | 5.0 |
| Lubron L-2 | variate |

The results of the test are as shown in Table 2.

TABLE 2

| Lubron L-2 (variate weight parts) | Final endurance life ($\times 10^3$ sheets) |
|---|---|
| 40 | 81 |
| 60 | 110 |
| 80 | 132 |
| 120 | 165 |

EXAMPLE 3

The same procedure as in Example 1 was repeated except that the kind and the compounding amount of an inorganic filler were changed.

| Compounding: weight parts | |
|---|---|
| Daiel G-901 | 100 |
| TAIC | 4.0 |
| Perhexa 25B | 1.5 |
| MT carbon black | 5.0 |
| Lubron L-2 | 60.0 |
| Inorganic filler | variate |

| Inorganic filler: Spherical copper powder MA-CDS (−30 meshes) | |
|---|---|
| | Mitsui Kinzoku Kogyo |
| Cobalt powder | Nihon Atomize Kako |
| Nickel powder | Nihon Atomize Kako |
| Cobalt-iron alloy powder | Fineatomel Fe50Co Kobe Seiko |
| Tungsten powder W-5 | Nihon Shin Kinzoku |

The results are as shown in Table 3.

TABLE 3

| Inorganic filler | Specific gravity | Compounding weight parts | Final endurance life ($\times 10^3$ sheets) |
| --- | --- | --- | --- |
| Cu | 8.92 | 80 | 52 |
| Co | 8.90 | 80 | 120 |
| Co.Fe | 8.38 | 75 | 125 |
| Ni | 8.85 | 80 | 118 |
| W | 19.30 | 170 | 186 |

According to the above Tables 1-3, it is apparent that it is important to combine a peroxide crosslinked fluororubber having a Mooney viscosity of 90 or more, a low-molecular weight ethylene tetrafluoride resin with more than 60 PHR and an inorganic filler comprising a powder of a solid material with surface energy higher than that of copper, in order to produce a hot-pressing fixing roll having a long endurance life of 100,000 copies or more.

Effect of the Invention

According to the present invention, a hot-pressing fixing roll with little stain on the surface and having a long endurance life can be provided.

I claim:

1. A roll having a rigid core and a non-adherent coating layer, wherein said non-adherent coating layer comprises a peroxide crosslinked fluororubber in which a low-molecular weight ethylene tetrafluoride resin is compounded.

2. The roll according to claim 1 wherein said fluororubber has a Mooney viscosity of 90 or more $ML_{1+10}$ (100° C.).

3. The roll according to claim 1 wherein a low-molecular weight ethylene tetrafluoride resin is compounded in an amount of 60 weight parts or more based on 100 weight parts of a fluororubber.

4. The roll according to claim 1, which is a hot-pressing fixing roll of a dry electrostatic duplicator.

5. A roll having a rigid core and a non-adherent coating layer, wherein said non-adherent coating layer comprises a peroxide crosslinked fluororubber in which a low-molecular weight ethylene tetrafluoride resin and an inorganic filler selected from the powders of solid materials having surface energy higher than that of copper are compounded.

6. The roll according to claim 5 wherein said fluororubber has a Mooney viscosity of 90 or more $ML_{1+10}$ (100° C.).

7. The roll according to claim 5 wherein a low-molecular weight ethylene tetrafluoride resin is compounded in an amount of 60 weight parts or more based on 100 weight parts of a fluororubber.

8. The roll according to claim 5 wherein said inorganic filler is selected from powders consisting of iron, nickel, cobalt, iron-cobalt alloy, tungsten and tungsten-carbide.

9. The roll according to claim 5 wherein said inorganic filler has an average particle diameter of 15 μm or less.

10. The roll according to claim 5 wherein said inorganic filler is compounded in an amount of 20 weight parts or more based on 100 weight parts of a fluororubber.

11. The roll according to claim 5, which is a hot-pressing fixing roll of a dry electrostatic duplicator.

* * * * *